March 26, 1957 M. F. ZIFFERER 2,786,277
TAPERED GAGE FOR SMALL HOLES
Filed Feb. 12, 1954 3 Sheets-Sheet 1
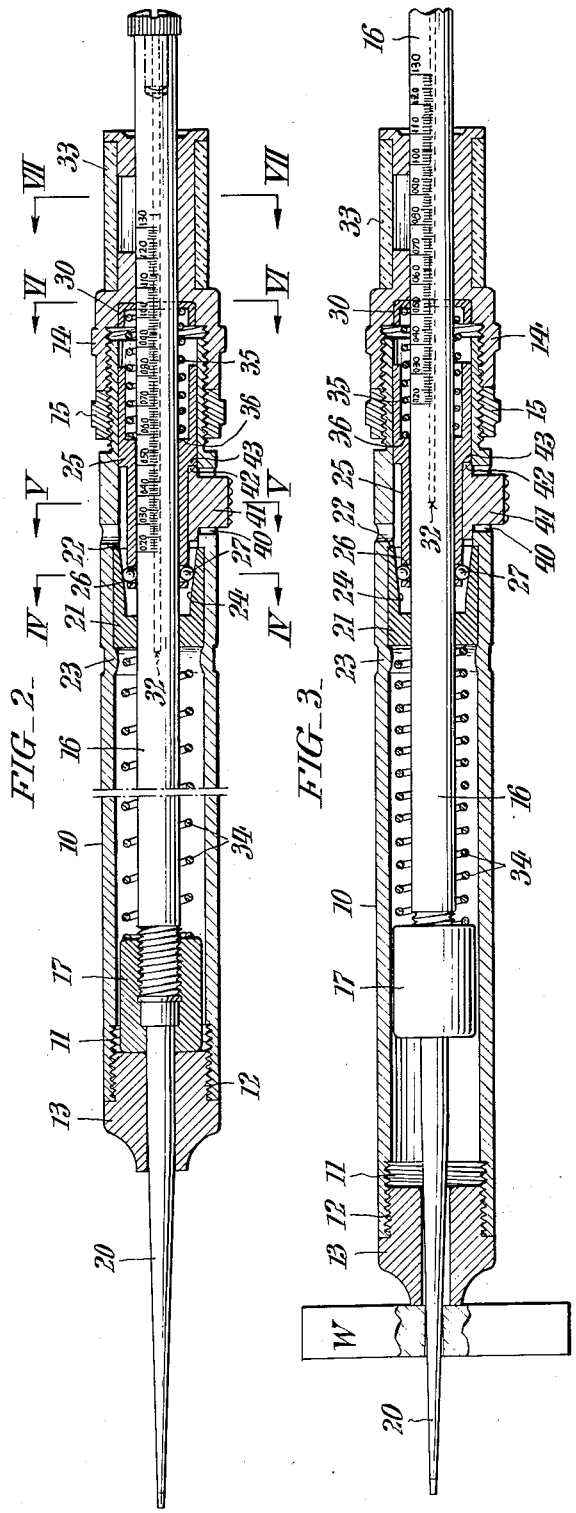
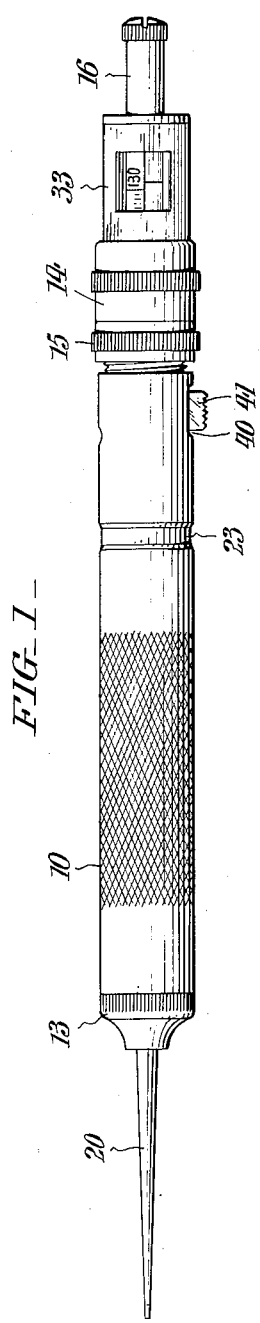
INVENTOR:
Morton F. Zifferer,
BY Paul & Paul
ATTORNEYS.

March 26, 1957 M. F. ZIFFERER 2,786,277
TAPERED GAGE FOR SMALL HOLES
Filed Feb. 12, 1954 3 Sheets-Sheet 2
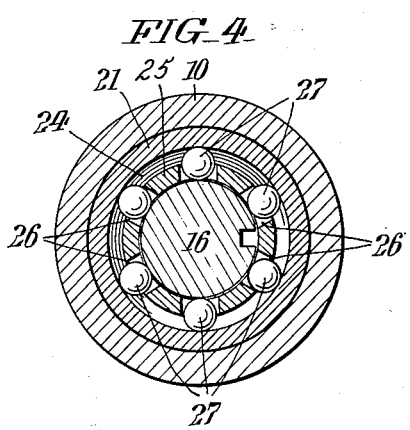
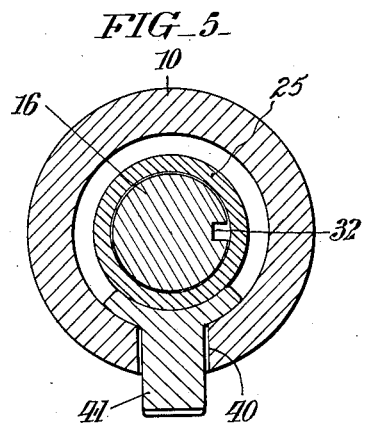
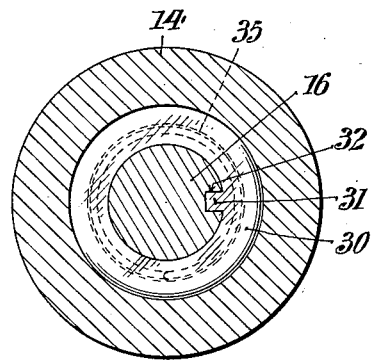
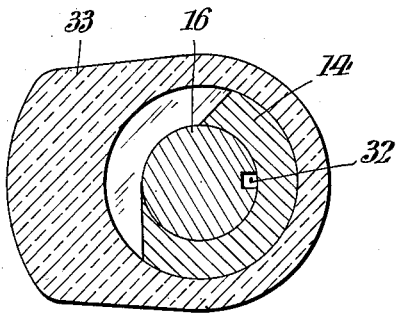
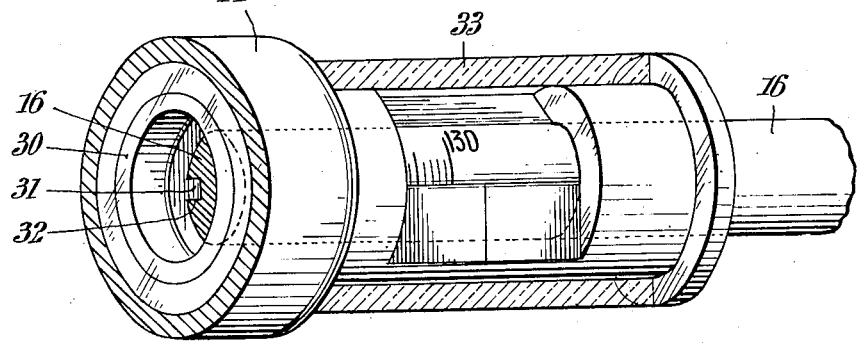
INVENTOR:
Morton F. Zifferer,
BY Paul & Paul
ATTORNEYS.

March 26, 1957 M. F. ZIFFERER 2,786,277
TAPERED GAGE FOR SMALL HOLES
Filed Feb. 12, 1954 3 Sheets-Sheet 3
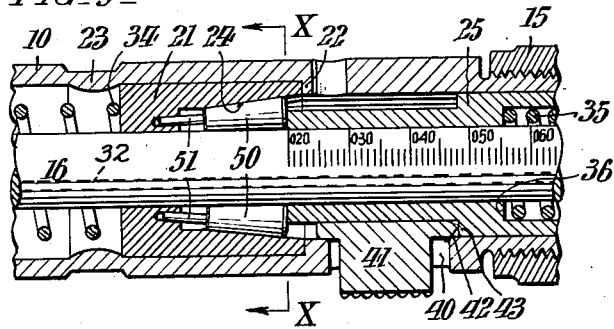
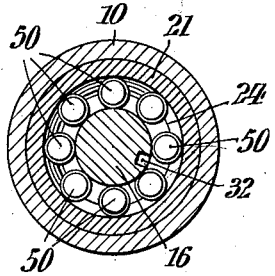
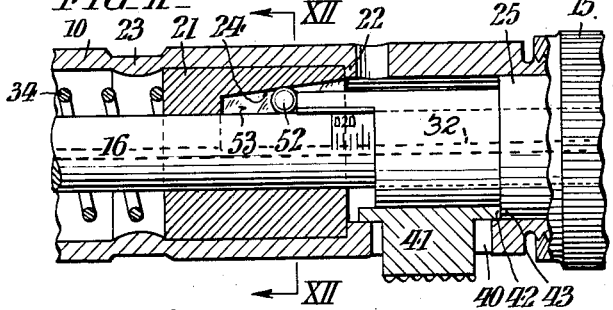
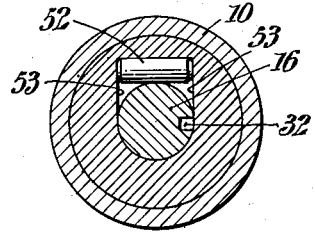
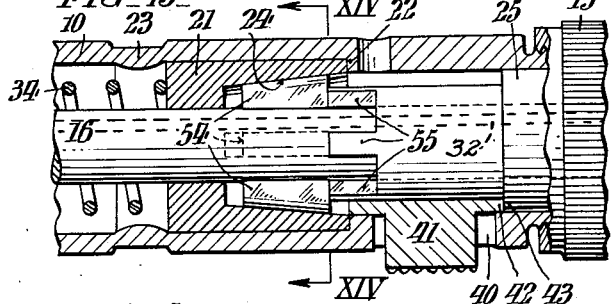
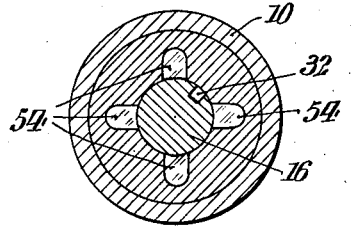
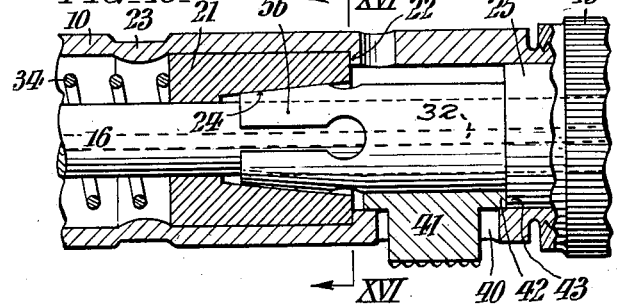
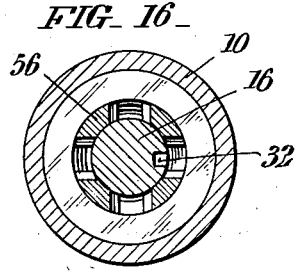
INVENTOR:
Morton F. Zifferer,
BY Paul & Paul
ATTORNEYS.

United States Patent Office 2,786,277
Patented Mar. 26, 1957

2,786,277

TAPERED GAGE FOR SMALL HOLES

Morton F. Zifferer, York, Pa., assignor, by mesne assignments, to Hamilton Watch Company, Lancaster, Pa., a corporation of Pennsylvania Application February 12, 1954, Serial No. 409,849

12 Claims. (Cl. 33—178)

This invention relates to a gage for measuring internal diameters, and further concerns a tapered gage adapted to be inserted into a hole to measure the internal diameter thereof. More specifically, this invention relates to a precision measuring instrument which is adapted to make fine measurements of internal diameters, the measurements being calibrated on a spindle which has a tapered front end adapted to being inserted into the hole.

It has been found that many conventional tapered hole gages tend to give readings which, although sufficiently accurate for rough work, are not sufficiently accurate for precision work. In some cases, a measuring error appears to be caused by the fact that the tapered member is wedged into the hole to such an extent that the measuring device is difficult to withdraw without disturbing the gage reading. It is accordingly one object of this invention to provide a tapered hole gage which is capable of giving precision readings which are not disturbed as a result of withdrawing the instrument from the hole under measurement.

Still another object of this invention is to provide a gage for measuring internal diameters wherein the gage calibrations are carried by the spindle which is inserted into the hole, and wherein the spindle has a precision tapered front end having capacity to give precision readings.

Another object of this invention is to provide a device which rapidly and accurately measures the inside diameter of a hole, and which enables an operator to make many such measurements in a minimum time with one hand. Still another object of the invention is to provide a hole gage which has a compact rugged construction and which is nevertheless capable of giving readings of precision accuracy. Other objects and advantages of this invention, including the simplicity and economy of the same, and the ease with which the measuring device may be adjusted and calibrated, will further become apparent hereinafter and in the drawings, whereof:

Fig. 1 represents a view in side elevation showing one specific form of hole gage constructed in accordance with this invention;

Fig. 2 represents a somewhat enlarged vertical sectional view of the gage shown in Fig. 1;

Fig. 3 represents a sectional view similar to Fig. 2, showing the tapered forward portion of the spindle inserted into a hole for measurement of the internal diameter thereof;

Figs. 4, 5, 6 and 7 represent sectional views taken as indicated by the lines and arrows IV—IV, V—V, VI—VI and VII—VII, respectively, which appear in Fig. 2;

Fig. 8 represents a view in perspective of the indicating portion of the hole gage, illustrating more particularly certain important features of construction thereof; and Figs. 9–16 represent vertical sectional views showing four modifications of the unidirectional braking means, each even numbered figure being a transverse sectional view taken as indicated by the lines and arrows of corresponding number.

Turning now to the specific embodiment of the invention selected for illustration in the drawings, the number 10 represents an elongated, substantially cylindrical hollow body member which carries at its forward end a set of internal threads 11 which engage corresponding threads 12 on an end cap 13 at the front end of said body member 10. Similarly threaded to the rear end of body member 10 is an adjusting cap 14 which is secured in adjusted position by a knurled lock nut 15 which is also threaded to the rear end of body member 10.

Extending through a central aperture in the adjusting cap 14 and through a central aperture in the end cap 13 is an axially arranged spindle 16. The spindle 16 has capacity to reciprocate forwardly and rearwardly relative to the body member 10. At its forward end the spindle 16 is threaded to a sleeve 17 which co-acts with the end cap 13 to limit the axial movement of spindle 16 in a forward direction. At its front end, the spindle 16 includes an integral, uniformly tapered measuring member 20. The tapered front end of the spindle is removably threaded to the spindle, whereby it may be removed and replaced. It will be observed that the rear portion of spindle 16 carries markings or graduations which are uniformly spaced along the spindle surface and serve to indicate the internal diameter of a hole into which the tapered measuring portion 20 is inserted.

The number 21 designates a stationary bushing which is anchored against an internal shoulder 22 formed in the body member 10, the body member 10 being compressed at 23 for this purpose. The bushing 21 has an internal conical surface 24 which is inclined outwardly toward the rear of body member 10. This is an important and advantageous feature of this invention as will further become apparent hereinafter.

Slidably mounted within the body member 10 is a sleeve 25 which has a plurality of small holes 26 (see Fig. 4) extending radially through its forward end, such holes 26 being equally spaced circumferentially. A small ball 27 is carried in each hole 26 and has a diameter considerably greater than the thickness of the sleeve 25 at its forward end. Each ball 27 has capacity to contact the conical surface 24 and simultaneously to contact the outside surface of spindle 16. It will accordingly become apparent that, when the sleeve 25 is urged forwardly, each ball 27 is wedged between the spindle 16 and the inclined surface 24, and these members coact to form a brake means having a positive braking action which prevents any movement of the spindle 16 forwardly relative to body member 10. At the same time, the spindle 16 is free to move rearwardly of the body member 10 since, in view of the direction of inclination of the conical surface 24, the balls 27 do not perform any wedging or braking function when the spindle is moved rearwardly. Accordingly, the brake means is unidirectional in its operation.

The number 30 designates a retainer cup which is preferably made of brass or some equivalent metal, which is press fitted into the end of adjusting cap 14. The retainer cup 30 has a radially extending key 31 (see particularly Fig. 6) which extends into a corresponding keyway 32 extending longitudinally of the spindle 16. Key 31 prevents the spindle from turning relative to the adjusting cap or the magnifying sight 33 carried by said adjusting cap.

Spring means are provided for controlling the operation of the measuring device. A helical spring 34 extends between the front face of bushing 21 and the rear face of sleeve 17, thereby continuously urging the spindle 16 to move axially forwardly relative to the body member 10. Another helical spring 35 extends from the front face of retainer cup 30 to an internal shoulder 36 formed in the brake member 25. Said spring 35 continuously urges the brake member 25 to move forwardly relative to the adjusting cap 14 and body member 10, thereby urging the balls 27 against the conical surface 24, and thereby locking the spindle 16 against movement forwardly relative to the body member 10. The body member 10 is slotted at 40 and a release member 41 extends through the slot. The release member 41 has a shoulder 42 which abuts against a corresponding shoulder 43 on the brake member 25.

The operation of the tapered hole gage will now be apparent. By moving the release member rearwardly relative to body member 10, the operator of the hole gage may slide the brake member 25 rearwardly, thereby freeing the spindle 16 for forward movement under the influence of its spring 34. When the operator releases the member 41, the spring 35 immediately slides the brake member 25 forwardly, bringing the balls 27 into operative relationship with the conical surface 24. The tapered forward end 20 is then inserted in a forward direction into a hole as indicated in Fig. 2. The periphery of tapered member 20 contacts the periphery of the hole, preventing further forward movement. The forward movement of body member 10 is continued until its front end contacts the wall W in which the hole is formed. The relative movement of the body member and spindle produces a gage reading which indicates the diameter of the hole. The tapered front end may be withdrawn from the hole without changing the gage reading, since the brake member including balls 27 prevents the spindle 16 from moving forwardly relative to the body member 10. After the instrument has been withdrawn and read, the operator returns the spindle to its extended position by drawing the release 41 rearwardly, as heretofore described.

Should any adjustment or calibration of the gage be necessary, this may be accomplished by turning the lock nut 15 away from adjusting cap 14, turning adjusting cap 14 until the correct reading is obtained on the magnifying sight 33, and tightening lock nut 15 against the adjacent end of adjusting cap 14. Because the spindle 16 is keyed to the adjusting cap, it turns with it, keeping the scale graduations aligned with the sight.

From the foregoing explanation it will be appreciated that exceedingly fine measurements may be made with accuracy using my instrument. Because of the precision narrow taper of the front end portion 20 and its relation to the spindle 16, in combination with the specific construction and arrangement of the braking means, accurate readings down to nearly one ten-thousandth of an inch are attainable. Moreover, the gage is designed to take readings down to 0.005" diameter holes, while conventional ballpoint micrometers go down only to a minimum diameter of about 0.090".

Further, the character of the braking means and releasing means renders the instrument convenient to operate, and greatly facilitates the completion of large numbers of precision measurements in a minimum time. The gage can be operated with one hand, leaving the operator's other hand free to hold the part to be checked or to perform other operations.

The spring actuation of the measuring means assures uniform readings since the accuracy of measurement is not dependent upon the operator's sense of touch.

It will further be appreciated that, in accordance with this invention, the gage is so designed that worn or damaged tapered needles may readily be removed and replaced by the operator by removing adjustment cap 14 and lock nut 15, and unscrewing the member 17 from spindle 16.

It is a further advantageous feature of this invention that the tapered needle may be retracted into the barrel 10 for protection when not in use, and it is automatically held in place by the unidirectional brake means.

It will be apparent from Figs. 9–16 that various modifications may be substituted for the unidirectional brake means shown in Figs. 2, 3 and 4. In Figs. 9 and 10 tapered rollers 50 are pivoted and longitudinally slidable on pins 51 which are carried by the bushing 21. Sleeve 25 bears against the rear faces of tapered rollers 50. In Figs. 11 and 12 a transversely extending cylindrical roller 52 is mounted free in a longitudinally extending tapered channel in the bushing 21. The side walls 53 of the channel are flat. In Figs. 13 and 14 separate, longitudinally slidable wedges 54 are provided. Their rear faces are engaged by fingers 55 formed integrally with sleeve 25. In Figs. 15 and 16 a tapered, slotted wedge 56 is provided which may be formed integrally with the sleeve 25.

It will be appreciated that the specific forms of unidirectional brake means shown in the drawings represent only some of a large number of structures which accomplish the same result. While each of the brake means shown in the drawings utilizes a wedging action, other devices may be used substituting friction or a combined wedging action and friction, without departing from the scope of this invention. In fact, unidirectional brake devices of other kinds may be utilized, provided they function in a similar manner to produce the same result.

While several specific embodiments of the invention have been illustrated in the drawings and described herein, it will be appreciated that the devices may be modified in many particulars without departing from the scope of this invention. For example, equivalents may be substituted for the members shown and described, parts may be reversed, and certain features may be utilized independently of other features, all within the spirit and scope of the invention as defined in the appended claims.

Having thus described my invention, I claim:

1. A hole gage comprising an elongated hollow body member, an elongated measuring member carried within and reciprocable axially along said body member, said measuring member having a tapered end extending beyond the corresponding end of said body member, unidirectional brake means within said body member and engaging said body member and measuring member, said unidirectional brake means comprising relatively inclined members responsive to axial thrust preventing relative axial movement of said body and measuring members in one direction but permitting relative movement of said members in the opposite direction, resilient means connected to said measuring member urging said measuring member to move in said one direction relative to said body member, and axially reciprocable releasing means extending into said body member and connected to said brake means to inactivate said brake means to permit relative movement of said body and measuring members in either of said directions.

2. The hole gage defined in claim 1, wherein the unidirectional brake means includes, as the braking member, a ball.

3. The hole gage defined in claim 1, wherein the unidirectional brake means includes, as the braking member, a longitudinally extending tapered roller.

4. The hole gage defined in claim 1, wherein the unidirectional brake means includes, as the braking member, a transversely extending roller.

5. The hole gage defined in claim 1, wherein the unidirectional brake means includes, as the braking member, a longitudinally slidable wedge.

6. The hole gage defined in claim 1, wherein the unidirectional brake means includes, as the braking member, a slotted wedge.

7. A hole gage comprising a body member, an elongated measuring member carried by and reciprocable along said body member, said measuring member having a tapered end, unidirectional brake means in the form of a wedge engaging said body member and measuring member, said unidirectional brake means preventing movement of said measuring member forwardly of said body member but permitting movement of said measuring member rearwardly of said body member, release means for inactivating said brake means, spring means connected to said measuring member to move said measuring member forwardly relative to said body member when said brake means is released, and spring means connected to said brake means and said release means for automatically inactivating the release means and re-activating the brake means.

8. A hole gage comprising an elongated hollow body, a measuring spindle reciprocable axially in said body, said spindle having a precision tapered front end extending beyond the corresponding end of said body, and unidirectional brake means including a tapered cone and a plurality of balls engaging said cone and spindle for controlling the relative movement of said body and spindle.

9. The hole gage defined in claim 8, wherein the tapered front end of the measuring spindle is removably threaded to said spindle, whereby it may be removed and replaced.

10. A gage for measuring the diameter of a hole comprising an elongated hollow body, a measuring spindle reciprocable axially in said body, said spindle having a tapered front end extending beyond the corresponding end of said body, said spindle having graduations spaced longitudinally thereon, a stationary member inside said body having an inclined surface adjacent said spindle, said surface being inclined outwardly toward the rear of said body, a sleeve member in said body slidable longitudinally relative to said stationary member, said sleeve member carrying a ball which has capacity to contact simultaneously said inclined surface and said spindle, spring means in said body urging said spindle toward the front of said body, other spring means in said body urging said sleeve member toward said inclined surface, thereby wedging said ball between said inclined surface and said spindle to brake said spindle against movement toward the front of said body, and manually operable release means extending through said body and contacting said sleeve member to move said sleeve member away from said inclined surface, thereby releasing said spindle for movement toward the front of said body.

11. A hole gage comprising an elongated hollow tube threaded at both ends, an adjusting cap and lock nut threaded to one end of said tube, a front cap threaded to the other end of said tube, a measuring spindle reciprocable longitudinally through said adjusting cap and said front cap, said spindle having a tapered front end and having a plurality of markings indicating its longitudinal displacement relative to said tube and said adjusting cap, sighting means carried by said adjusting cap coacting with said markings, spring means inside said tube for urging said spindle forwardly, and releasable unidirectional brake means in the form of a wedge for normally maintaining the spindle in a withdrawn position in opposition to said spring means.

12. The hole gage defined in claim 1 wherein means are provided including a longitudinally extending key and keyway for preventing relative rotation of said measuring member and body member about the axis.

References Cited in the file of this patent
UNITED STATES PATENTS

| | | |
|---|---|---|
| 1,529,650 | Darlington | Mar. 17, 1925 |

FOREIGN PATENTS

| | | |
|---|---|---|
| 161,349 | Great Britain | Apr. 14, 1921 |
| 867,716 | France | Nov. 25, 1941 |
| 237,646 | Switzerland | Aug. 16, 1945 |
| 584,526 | Great Britain | Jan. 16, 1947 |